United States Patent [19]

Battmann et al.

[11] Patent Number: 4,864,603
[45] Date of Patent: Sep. 5, 1989

[54] METHOD OF TRANSMISSION OF INFORMATION OR MEASUREMENT DATA AND DEVICE FOR USING THE METHOD

[75] Inventors: Jean-Claude Battmann, St Genis Laval; Gérard Brochard, Lyon; Jean-Marie Charamnac, Villeurbanne; Roland Finas, Beauvoir De Marc; Vincent Pietri, Paris, all of France

[73] Assignee: Elf France, Courbevoie, France

[21] Appl. No.: 97,067

[22] Filed: Sep. 16, 1987

[30] Foreign Application Priority Data

Sep. 16, 1986 [FR] France ............................ 86 12941

[51] Int. Cl.⁴ .......................................... H04M 11/00
[52] U.S. Cl. ..................................... 379/106; 379/92; 379/97
[58] Field of Search ................... 379/92, 98, 106, 107, 379/97, 96

[56] References Cited

U.S. PATENT DOCUMENTS

| | | | |
|---|---|---|---|
| 4,126,762 | 11/1978 | Martin et al. | 379/106 |
| 4,504,831 | 3/1985 | Jahr et al. | 379/107 |
| 4,578,700 | 3/1986 | Roberts et al. | 579/92 |
| 4,623,758 | 11/1986 | Batla et al. | 379/98 |
| 4,716,582 | 12/1987 | Blanchard et al. | 379/28 |

FOREIGN PATENT DOCUMENTS

| | | |
|---|---|---|
| 3213217 | 10/1983 | Fed. Rep. of Germany . |
| 2500246 | 8/1982 | France . |
| 2528647 | 12/1983 | France . |
| 2543302 | 9/1984 | France . |
| 2097223 | 10/1982 | United Kingdom . |
| 2099260 | 12/1982 | United Kingdom . |
| 2178928 | 2/1987 | United Kingdom ................ 379/107 |

Primary Examiner—Jin F. Ng
Assistant Examiner—Wing F. Chan
Attorney, Agent, or Firm—Oblon, Spivak, McClelland, Maier & Neustadt

[57] ABSTRACT

A method of transmission of information or measuring data and devices for using the method, wherein information or measuring data is transmitted from a local measuring device, located at a remote site, to a central interrogation station located at a central site where the data is processed, using a common carrier network while permitting the normal use of the telephone line. The data is transmitted from the local station to the central interrogation station by sending of a first call from the central station to the local station over the telephone line, the ringer of the called set being temporarily rendered inoperative, repetition, after a certain period has passed, of the call by central station, tying up of the line by the local station, and execution of the transmission procedure.

9 Claims, 5 Drawing Sheets

FIG. 3

METHOD OF TRANSMISSION OF INFORMATION OR MEASUREMENT DATA AND DEVICE FOR USING THE METHOD

BACKGROUND OF THE INVENTION

1. Field of the Invention

This invention relates to a method of transmission of information or measuring data and device for using the method.

This method can advantageously be applied in telemetry devices by making it possible, for example, from a central set or central station to interrogate local stations that measure certain parameters such as, for example, consumption of fuel by a boiler, distribution of gasoline at service stations or depots, consumption of household fluids such as electricity, gas, water.

Other applications such as measurement of service or access to services or data bases can also be envisaged.

2. Discussion of Background

Such telemetry devices are known in the prior art and are classified in three categories. A first category of devices relates to devices whose central acts like a slave and is called by the local stations. These devices have the drawback that several local stations can decide at the same time to access the central and, in this case, a collision occurs.

In second category of device, the central operates as a master and decides on the calls to the local stations. In these devices, the central sends a call by the telephone lines to the local station and the latter, as a result of this call, sends the measuring results. These devices have the drawback that initiation of a telephone call to the set suffices to obtain transmission of the measurements, which can be annoying.

In this same category of devices where the central is master, an improvement has been made which consists in having a call sent by the central and having this call followed by an interrogation signal. This signal, depending on the devices, can be produced before or after the ringing signal. In case the interrogation signal is produced before the ringing signal, this interrogation signal enables the local station to tie up the subscriber's line before the ringing signal has been sent. This avoids disturbing the subscriber unnecessarily. In this type of device, the interrogation signals consist either of a direct current which is sent over the telephone line or of a voltage drop or increase in relation to the normal voltage of the line or, finally, of a given frequency. The latter type of device with an interrogation signal consisting of a given frequency can be illustrated by European patent application No. 0014774. Such devices, if they do offer an improvement in the security of the connection between the central and the local station, and consequently of the transmission, still have flaws. Actually, a cheat could detect on the telephone line the frequency signal sent to interrogate the local device and then make calls by having them followed or preceded by this frequency signal and thus cause transmission of data and possibly resetting of the counters or memories which allow storage of the measurements. Further, such devices require considerable modifications of the existing telephone installations.

On the other hand, it is known by the patent application FR 2 373 109 to use a precall procedure followed by a call on a telephone line at the end of which a remote control instrument is connected which will make it possible to trigger remotely the starting of a household device, such as, for example, a boiler. In this device, the precall allows presensitizing of the receiver while the second call constitutes an order execution signal. It is even possible to envisage remote control of several instruments by the same line by causing the number of precall rings to vary as a function of the device to be controlled. In the device of French patent application No. 2 373 109, the calls that follow the precall should comprise a number of rings equal to the number of precalls except for a constant factor K.

This type of remote control device with the precall procedure is intended to be used for a dwelling that is normally vacant since the remote control of an instrument is desired and consequently the number of rings and the ringing are not a bother to the subscriber who is absent.

Finally, anyone, who could call the line to which the remote control instrument is connected, could very well allow ringing for a number of times corresponding to the precall, hang up and, not obtaining any answer, call again after a time and allow ringing for a number of times corresponding to the call. The result of this fortuitous maneuver would be triggering of the remote control. Consequently, this type of instrument does not make it possible to distinguish the calls really corresponding to a remote control from chance calls for which an action should not be executed.

In French patent application No. 2 500 246, a device is provided in which detection of the ringing trains is performed by detectors that supply signals when a call signal is received on a line. This device therefore takes into account the appearance of the call signal and does not take into account the period or even the nature of this signal. This device has the drawback of being very sensitive to spurious signals. Further, the use of detectors that are triggered by the appearance of call signals to cause either the connection or suspension of the ringer causes this suspension to be incomplete and there will always be a slight ringing corresponding to the appearance of the variation of the call signal.

It has also been proposed in British patent application No. 2 097 223 to trigger the connection or disconnection in parallel by the detection of the interval existing between two call signals, this triggering occurring when said interval is greater than a visual interval. This arrangement has several drawbacks, in particular that of being very sensitive to the appearance of spurious signals or also to the appearance of a second call completely independent of the first call (call of another subscriber).

SUMMARY OF THE INVENTION

A first object of the invention is to propose a method of transmission of information or measuring data for a telemetry device which makes it possible to avoid the drawbacks of the prior art of telemetry devices.

This first object is attained by providing a method for transmission of information or measuring data from a remote local measuring device to a central interrogation station located at a central site where the data is processed, by use of a telephone network such as the common carrier network, while allowing a normal use of the telephone line, the subscriber's ringer normally being inoperative, wherein data transmission from the local station to the central interrogation station is performed in the following steps:

maintaining the ringer inoperative, sending, during time T O, of a first call from the central to the local station over a line, the ringer of its called station being temporarily disconnected, said time To being at least equal to the time at the end of which the telephone network was able to verify that the line was not busy, repetition, after a certain time has passed, of the call by the central station, tying up of the line by the local device, execution of the transmission procedure, and resumption of the ringing during reception by the local station of a first call of a period greater than time To, this resumption making possible the normal functioning of the line which is rendered inoperative at the end of said call.

Thus, this method of recognition which is based on the analysis of an interval makes it possible to eliminate the problems of considering interferences that occur when working on a first pulse of a ringing train. Verification by the network that the line is not busy requires a certain time for the central sender to be able to make this verification according to the following principle. During a call, the local station receives, by the telephone network, for example the common carrier network, a ringing train in response to which the central station will receive, by means of the same network, a ringback which is often two-phase or delayed. If the local station is busy with another call, there will not be any ringback. Because of the phase shift, the appearance of the first ringback can occur at the end of the second call ringing, or even of the third. Therefore it is necessary to provide a time To which is greater than the period of appearance of the first ringback, a period which can vary with the nature of the telephone network used. By way of indication, and for the common carrier network used in France, a time To will be chosen which corresponds to a period expiring between the second and third ringing.

A second object of the invention is to propose a method which also makes it possible to eliminate the drawbacks of the remote control devices with precall, in the application of the precall principle to telemetry devices.

This second object is achieved by the fact that the method in the transmission procedure comprises the following steps:

verification of the absence or presence of a carrier of the modem coming from the central interrogation station, sending of a voice message by a message-generating device from the local station, in case of absence of said carrier, freeing of the telephone line with shutoff of the ringer being maintained.

Another object of the invention is to propose a method in which the transmission procedure makes it possible to increase security.

This object is achieved by the fact that the transmission method in the transmission procedure comprises the following steps:

verification of the presence of the carrier of the modem of the central interrogation station, sending of a secret code by the central interrogation station, data transmission by the local station after reception and verification of the secret code, acknowledgement of successful reception by the central interrogation station, freeing of the telephone line with shutoff of the subscriber's ringer being maintained.

Another object of the invention is to propose a local station making it possible to use the above method.

This object is achieved by the fact that the local station comprises a circuit for detecting the ringing signal, means for evaluating the period of the ringing signal, means to provide tying up and freeing of the line, means to measure a variable, means to store the measurements of the variable, means for transmission of the stored measurements, means to connect and disconnect the subscriber's ringer, a microprocessor for controlling the various means and for processing the instructions of a program, means for storing the control program.

Another object of the invention is to propose a central interrogation station making it possible to use the method.

This object is achieved by the fact that the central interrogation station comprises a microprocessor having random-access and read-only memories necessary for the functioning and execution of the programs, a means for tying up the line, a call dialing device, a modem, a line interface with duplexing device, an asynchronous series interface of the R S 232 type to a data processing device.

According to another characteristic, the processing device of the interrogation station consists of a microprocessor with its associated peripherals.

According to another characteristic, the local station comprises a voice message-generating device, means for displaying the measurement stored by secondary storage means, a backup power supply and a relay for controlling the disconnecting of the instrument.

According to another characteristic, the interrogation station comprises an interrogation program loaded by diskette into the microprocessor, making it possible to choose the type of interrogation program as a function of the application and number of local stations to be called.

According to a last characteristic, the interrogation station comprises a program for communication with the central device loaded by diskette into the microprocessor making it possible to recover all or part of the data during interrogations or after the end of the interrogations.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 3 is a the block diagram of a central interrogation station.

It is understood that this description has no limiting character and that it is possible to use elements other than those described, without going outside the scope of the invention as will come out below.

DESCRIPTION OF THE PREFERRED EMBODIMENTS

Figure 1:
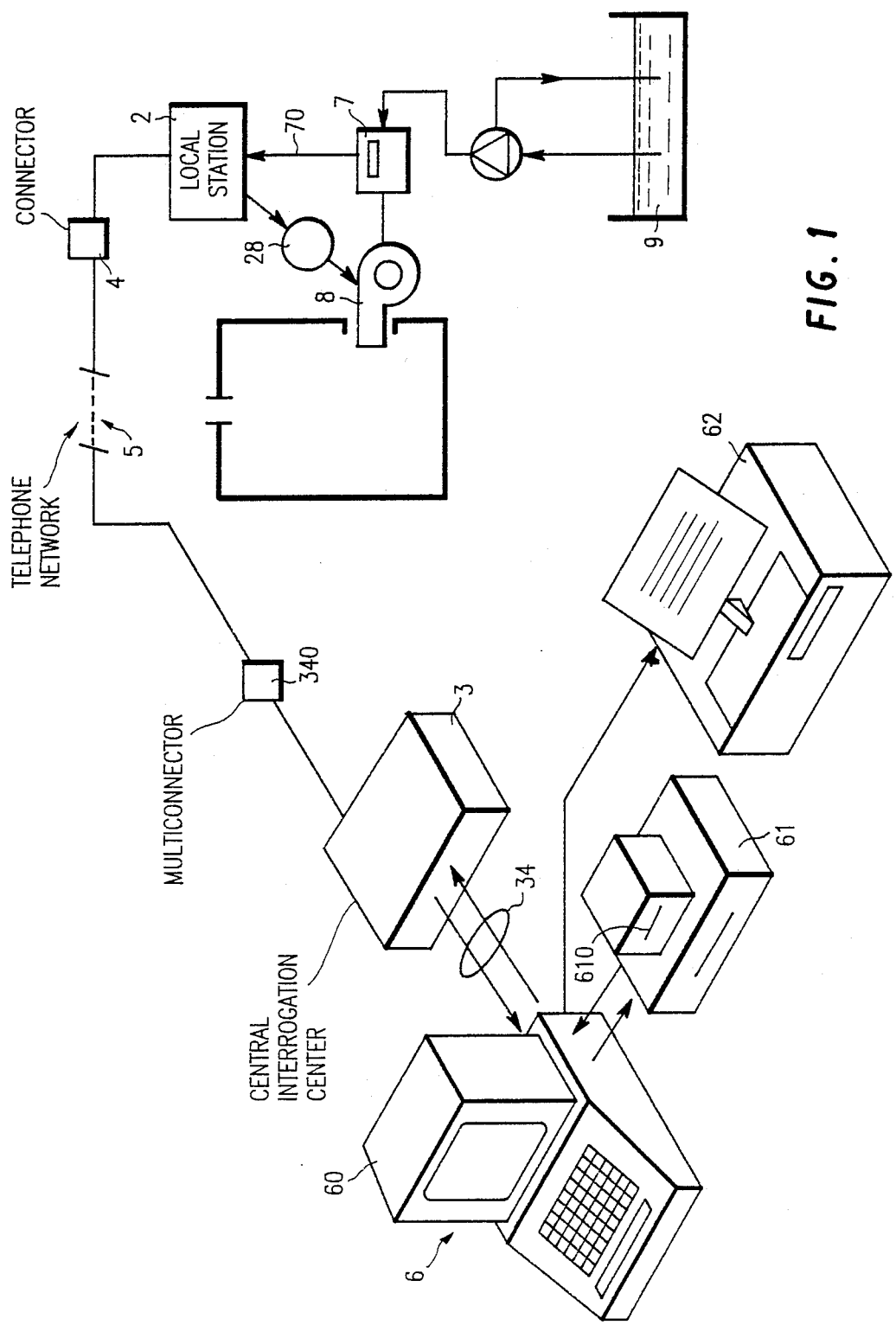
FIG. 1 is a diagrammatic view of the device unit making possible the use of the method.

Referring now to the drawings, wherein like reference numerals designate identical or corresponding parts throughout the several views, the entire device making possible the use of the method is represented in FIG. 1 and comprises a central interrogation station (3) connected by a two-way connection (34) to a data processing device (6) consisting of a microcomputer (60) connected to a mass memory device (61) consisting, for example, of a hard disk or a magnetic tape or other mass memory device. A diskette reader (610) is also connected to microcomputer (60). Finally, a printer (62) is connected in a known way to this microcomputer (60) and this entire device constitutes the device for processing data and information. Central interrogation station (3) is also connected by a multiconnector (340) to telephone network (5). A local station (2) is connected by a connector (4) to telephone network (5) and by this telephone network (5) to the central interrogation station. It is obvious that only a single local station has been represented but the device is intended to function with a plurality of these stations. Local station (2) is connected by a connection (70) to a probe (7) or sensor for the magnitude to be measured. In the example shown, this probe (7) consists of a volumeter placed in the path of the fluid consisting of the fuel that feeds burner (8) of a boiler and coming from a tank (9). It is quite evident that the application to boilers and volumeters should not be considered as being limiting. Actually, the probe can be replaced by any other measuring device so as to cover all applications that can be envisaged. As will be seen below, the same station can comprise several probes.

Figure 2:
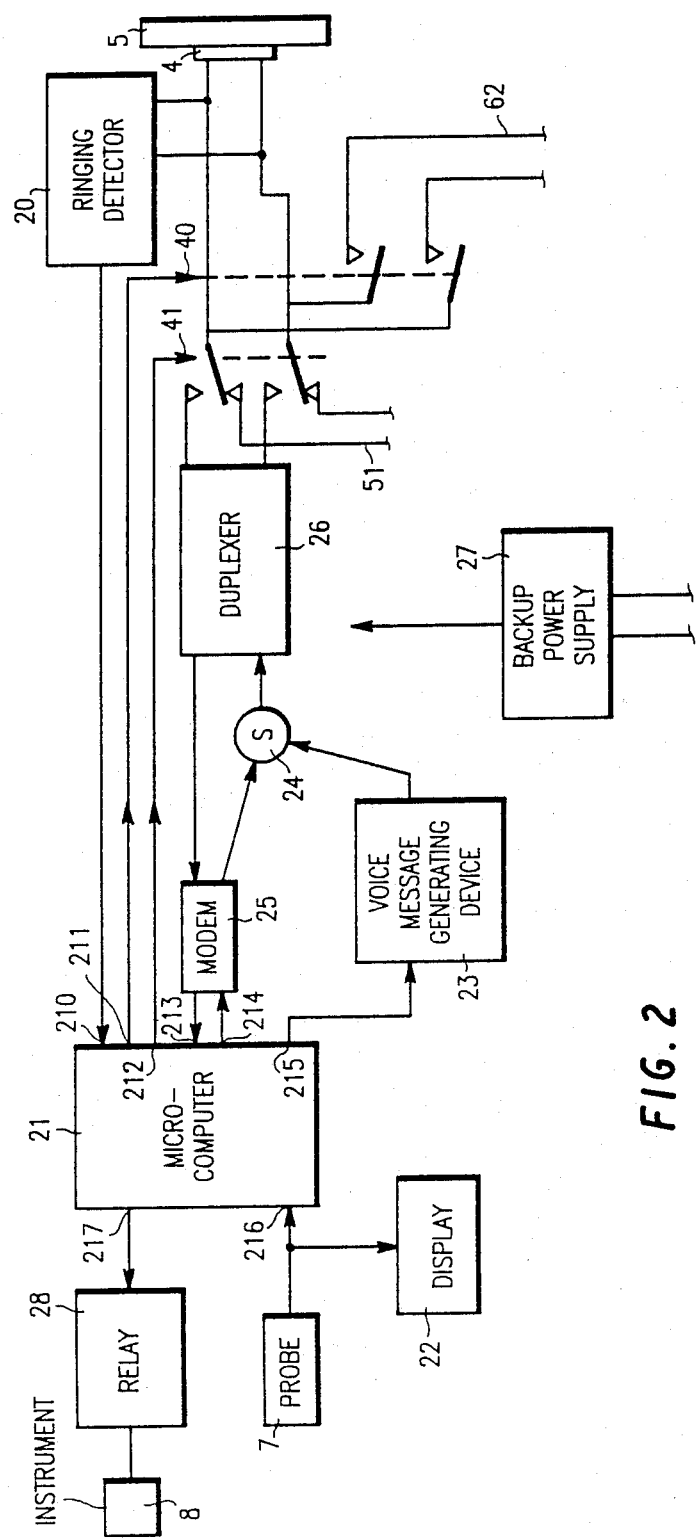
FIG. 2 is a the block diagram of a local station.

As shown in FIG. 2, each local station consists of a backup power supply (27) feeding the various circuits of the station. This station is controlled by a microcomputer (21) comprising a microprocessor, its memories and associated input and output devices. This microcomputer (21) receives at its input (216) the data coming from probe (7), which is also sent to a local display (22). Input (210) of microcomputer (21) receives the output signal of a ringing detector (20) which is connected, on the other hand, to telephone network (5) by connector (4). A first electromagnet (40) controls the contacts for cutting off the line of the subscriber ringer (62), a second electromagnet (41), by switching, controls a pair of contacts between a position where network (5) is normally connected to line (51) of the subscriber and another position in which network (5) is connected to the input of a duplexing interface circuit (26). Electromagnet (40) is controlled by output (211) of the microcomputer, while electromagnet (41) is controlled by its output (212). An input of duplexer (26) receives the output signal from a summator (24), while the output of this duplexer (26) is sent by a modem (25) one of whose inputs is connected to output (214) of the microcomputer. Another output of this modem is connected to input (213) of the microcomputer. Summator (24) receives at a first input the output of modem (25) and at a second input the output of a voice message-generating device (23). This voice message-generating device (23) receives at its input the output (215) of the microcomputer which constitutes a control signal for starting the voice message generation.

A relay device (28) for connecting and reconnecting instrument (8) makes it possible to put the latter in a failure state as soon as the microcomputer sends a suitable signal representing a bad functioning of the unit. Device (28) can also be connected to an alarm system or a backup system or the like.

Figure 3:
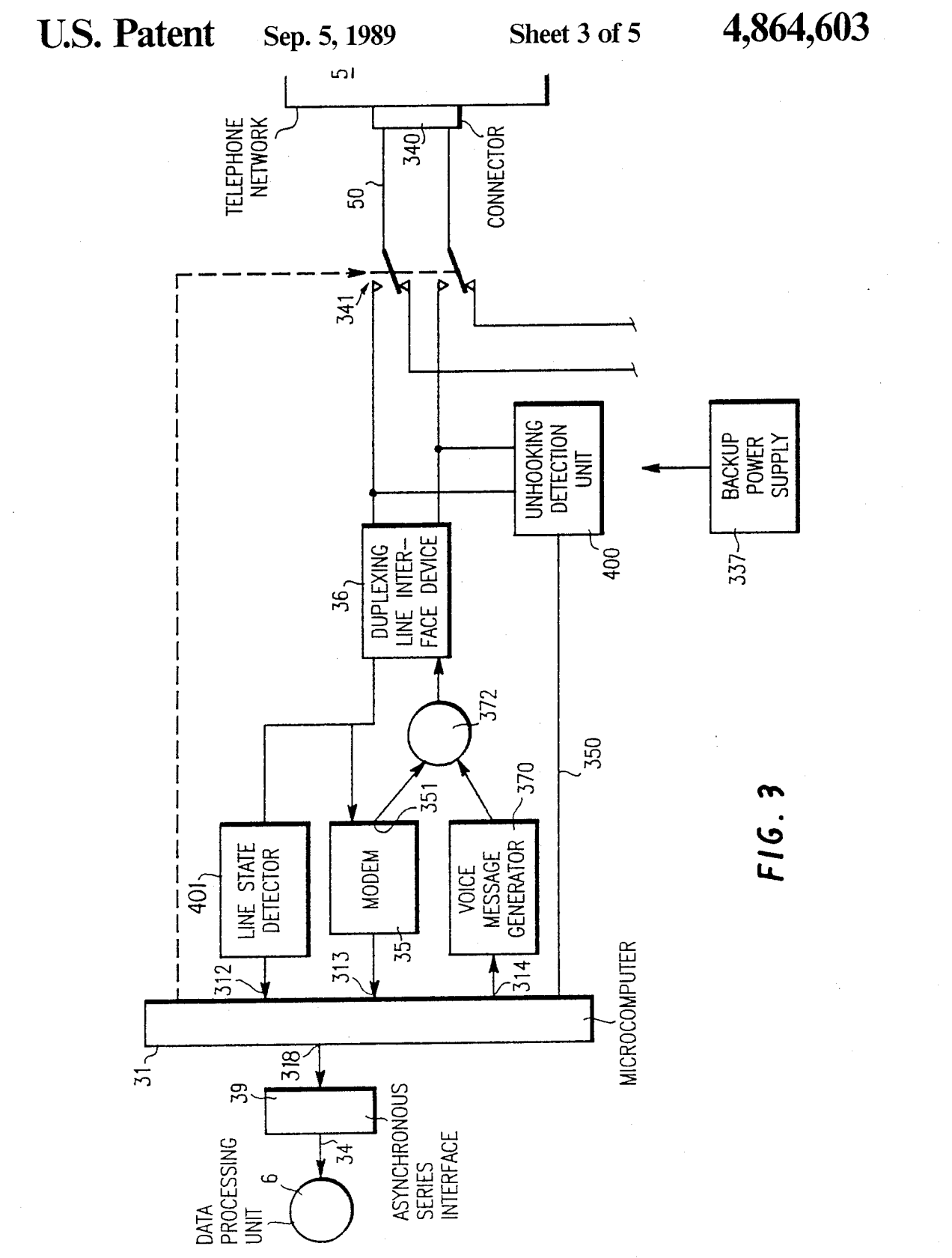

The central interrogation station represented in FIG. 3 also comprises a connector (340), a microcomputer (31) connected by its output to electromagnet (341) which makes it possible to connect either the central station or the normal line to network (5). This microcomputer receives at its input (313) the output of a modem (35) which is connected by a two-way connection to a duplexing line interface device (36), which is connected by the contact of electromagnet (341) to lead-in wire (50) of common carrier network (5). An output (314) of the microcomputer is connected to duplexing line interface device (36) to control its numbering function which can be either decimal or multifrequential.

Between connector (340) and the duplexing line interface device (36) is mounted an unhooking detection unit (400) which makes it possible to verify that the line has indeed been unhooked and to send by line (350) the signal representing this successful unhooking to microcomputer (31). This detection (400) unit can operate either by polarity reversal or by any other method.

The central interrogation station also comprises a line state detector for analysis of the line tones (401) which makes it possible to send to microcomputer (31) a signal representing the state of the line, i.e., for example, to determine if the line is tied up by recognition of the usual busy signal.

Like local station (2), central station (3) comprises a voice message generator (370) which is connected to duplexing line interface device (36) by a summator (372), mounted in series with output (351) of modem (35).

Output (318) of microcomputer (31) is connected to an asynchronous series interface (39) of the RS 232 type, as defined by the standards of the ETA: Electrical Industry Association. Of course, any known synchronous, asynchronous or parallel system can be used. This asynchronous series interface is connected by a two-way connection (34) to an information and data processing unit (6). Finally, this central interrogation station is also provided with a backup power supply (337) which makes it possible to provide backup power feeding to the various components of the station.

Figure 4:
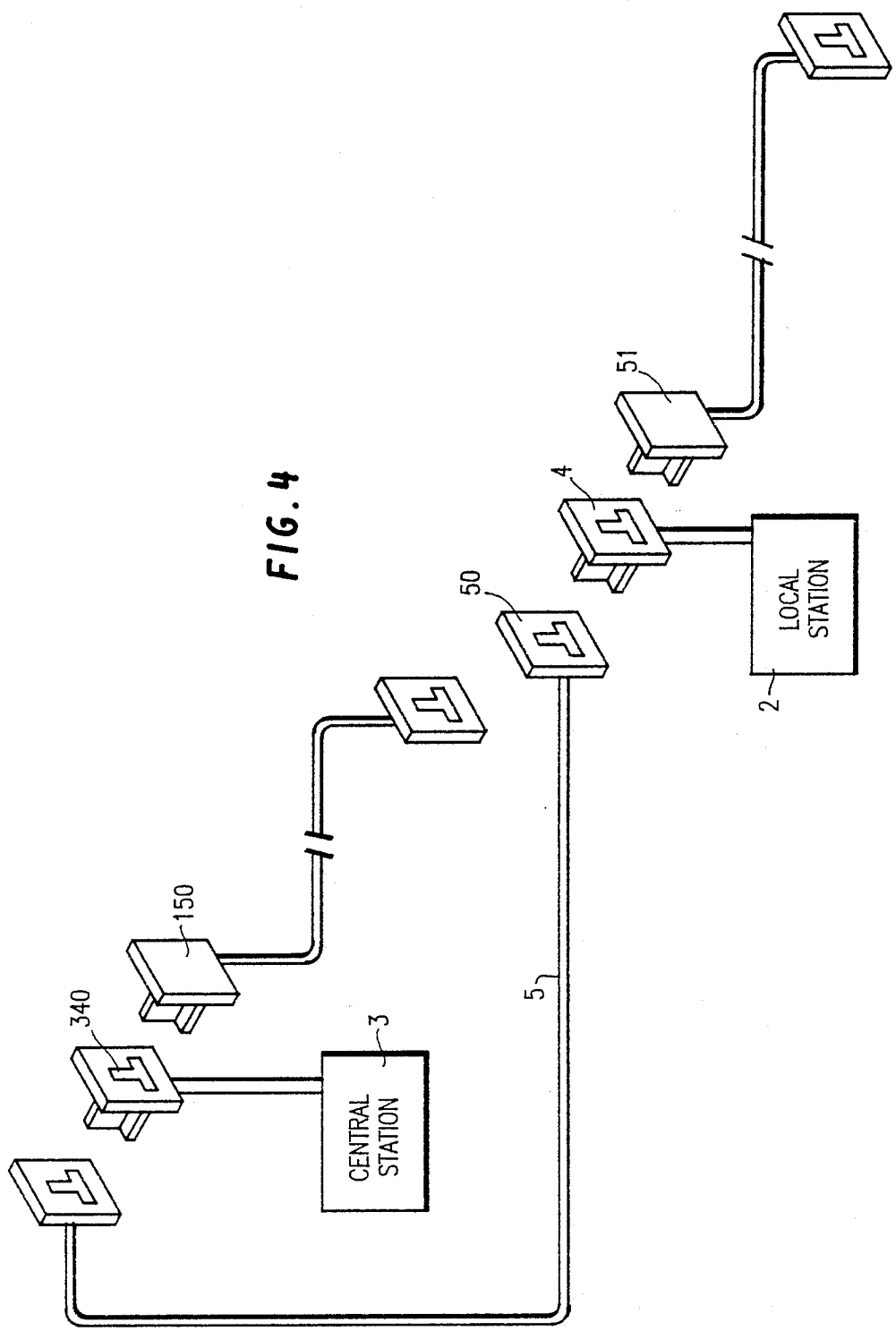
FIG. 4 is a diagrammatic view illustrating the connection of the local station and the central station on the common carrier network.

FIG. 4 represents common carrier network (5) at the end of which is a female connector (50) for a telephone set, into which a multiconnector (4) can be plugged. This circuit closer is connected, as represented, by a cable to local station (2) or to a central interrogation station (3). To this circuit closer (4) is connected a male connector (51), which provides the extension of the line to the subscriber's set. Central station (3) is connected to network (5) by connector (340) which can also provide an extension (150) to a normal line.

The devices that have just been described make it possible to use the method of transmission of information or measuring data which will be described below in connection with FIG. (5). When an operator wishes to interrogate local stations, for example, to know the status of the fuel reserve, he puts into the computer software containing the interrogation program. This program makes it possible, by action on a keyboard, to choose the type of interrogation as a function of the application and the number of clients or local stations to be called. The computer sends to the central interrogation station the number to dial and gives the order to make a call. The central station is connected to the common carrier network by electromagnet (341).

Figure 5:
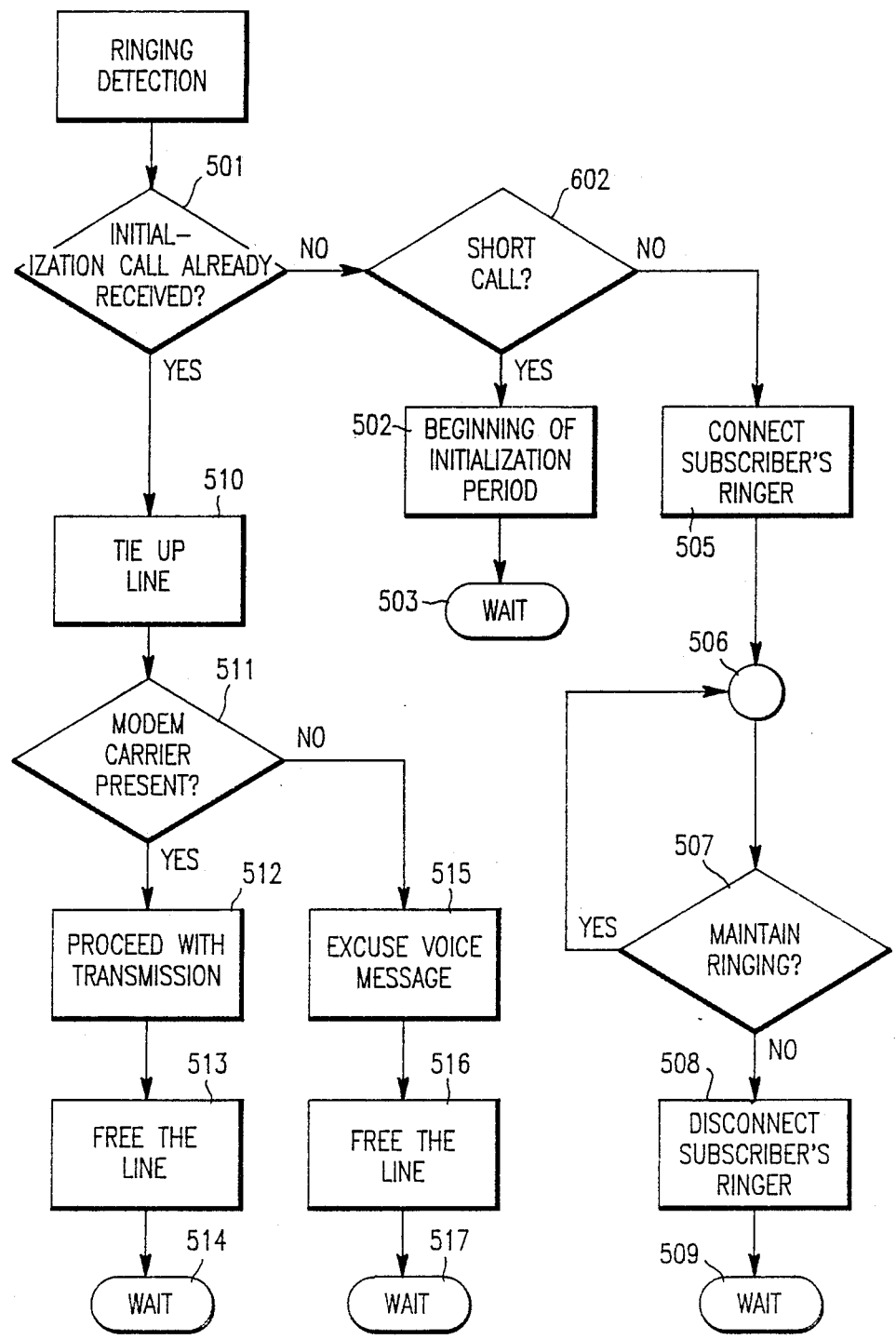
FIG. 5 is a flow chart of the various steps of the method.

The called local station receives, by the common carrier network, a train of ringing signals, which are detected by ringing detection circuit (20). From this moment, the procedure of the method represented in FIG. 5 is used. As soon as a ringing is detected, detector (20) sends a signal to input (210) of the microcomputer, which will run its application program which provides a first test represented by step (501) to determine if an initializing call is in progress. In case such an initializing call is not in progress, the following step (602) of determining the length of the call begins. In case it is a short call, i.e., in case the ringing detector sends signals during a period less than the a time TO determined by a program, the microcomputer determines that it is the start of an initializing call represented by step (502) and modifies the state of a storage means, making it possible to store the fact that it is a start of an initializing call. Then the microcomputer takes a waiting position represented by step (503). Under these conditions, i.e., an initializing call is in progress, when a ringing is detected at step (501), the microcomputer goes on to following step (510) which consists in tying up the line. This step is performed by sending, by output (212), a control signal to electromagnet (41) to make the contacts swing to connect the common carrier network to duplexing device (26).

For its part, the central interrogation station, after dialing for the second time the number of the local station to be called, starts its modem which will send its carrier.

On the part of the local station, after tying up the line (510), step (511) begins consisting of a test to determine if the carrier of the modem is present or not. In case the absence of the carrier of the modem is established, a call other than a call from the central is involved consisting, for example, of a subscriber making a precall by chance and then, after some time, making a normal call. The central station also may have begun the precall procedure and during the waiting time of the central station, before resending of its call, a call from a subscriber has intervened. In this case, the device goes to following step (515) which consists in sending an excuse voice message sent by device (23) following the command sent by output (215) of microcomputer (21). After this excuse voice message, following step (516) begins which consists in freeing the line. This freeing of the line is performed by deactivating output (212) of the microcomputer, which causes the passage into the rest position of the contacts controlled by electromagnet (41). After the line-freeing operation, the waiting position, represented by step (517), is held.

Finally, in case the modem carrier has been detected at step (511), i.e., in case a call procedure on the part of the interrogation central is indeed involved, the following step begins consisting of the procedure of transmission of the measurements made by the local station. This transmission procedure represented at step (512) is performed as follows. After sending of the modem carrier by the central interrogation station, the central interrogation station sends a secret code which must be received and verified by the local station before the local station sends the data measured by sensor (7) and stored in a storage device (not shown) but forming an integral part of microcomputer (21). At the end of the transmission of the data by the local station, the central interrogation station acknowledges successful reception of the data and the local station frees the line with shutoff of the subscriber's ringer being maintained. This operation is represented by step (513) of FIG. 5 and the local station starts waiting, represented by step (514). For its part, the central station also frees the line until use of a new interrogation procedure by the operator.

When the call detected at step (602) is not a short call and at step (501) an initializing call is not involved, step (505) begins during which microcomputer (21) acts, by its output (211), on electromagnet (40) to connect the subscriber's ringer. Consequently, from that moment on, everything happens for the subscriber as if he has a normal telephone line and he will not note that there has been a number of rings of a period less than time TO which were disconnected. After this step (505), the microcomputer will cyclically come to perform a test to know if the ringing connection is to be maintained, this test being represented by step (507). The tests consists in periodically checking input (210) of the microcomputer to see if there is still a ringing detection signal. When the ringing signal disappears, it means either that the subscriber has unhooked the telephone set or that the caller is discouraged and from that moment on, under these two hypotheses, it is not necessary to maintain the ringing. In this case, step (508) begins which consists in shutting off the subscriber's ringer by controlling output (211) so that electromagnet (40) by its action on the contacts of the ringer disconnects the latter. Then the device takes the waiting position represented by step (509). Thus, therefore, it is found that in its normal position, the subscriber's set has its ringer shut off but this state of affairs does not appear to the subscriber because he cannot be aware of the precall testing procedure.

In regard to the central station, the microcomputer has software which, after having given the order to send a precall consisting of X number of rings and after having allowed a fixed period to pass after this precall, redials the number of the local station and sends a certain number of rings during a more or less long time which can be longer or shorter than time TO. The logic of microcomputer (31) of central station (3) has all the elements which enable it to take into account the procedure blocking or allowing orders delivered by the line tone analysis system as well as the unhooking detection unit. Further, this software makes it possible to produce, by a voice message-generator, an excuse message in case of error either by a synthesizer or a tape recorder.

Finally, the operator, by changing of software contained on a diskette and constituting a communication program with the interrogation central, will be able to recover all or part of the data received, either during the interrogations or after the end of the interrogations of the local stations. This will then make possible the processing of this data by a program loaded into the computer.

It therefore is understood, with the help of the above description, which thanks to the devices described and the method used, it was possible to increase the security aspect of the telemetry operations without disturbing the normal functioning of a telephone line between the subscriber and central station, while giving sufficient flexibility to the system. Finally, the use of a microcomputer makes it possible to increase both the flexibility of the system and the flexibility of the processing of the data received.

But the invention is not limited to the embodiment given. A man of the art will be able to make any variant in the details illustrated. For example, although the embodiment illustrated provides electromechanical contacts to begin communication between the network and the duplexing terminal equipment or the line of the central station, it is quite evident that it will be possible to use any relay or other switching means in place of these electromagnets. The case is the same for relays (40) and (41) of the local station. Further, the description was made with reference to a microcomputer and to those associated elements. A man of the art could, of course, use any data processing device.

This installation can be used to monitor several instruments such as (8) or several measurements given by several probes such as (7), in this case the secret code will be used to allow the microcomputer to select the data to be sent to the central station.

Obviously, numerous additional modifications and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. A method of transmission of information or measuring data from a local measuring device, located at a telephone subscriber's local station at a remote site, to a central interrogation station located at a central site where the data is processed, using a telephone line of a telephone network to which said subscriber subscribes while permitting the normal use of the subscriber's telephone line, wherein the subscriber's ringer is normally maintained inoperative, comprising the following steps:

maintaining the ringer inoperative;
   sending, during a first period of time, a first call from the central station to the local station over the telephone line, said period of time being at least equal to the time necessary for the central station to be able to verify that the line is not busy by receiving a ringing signal;
   sending a second call from the central station to the local station for a different period of time;
   establishing telephone contact with the local station;
   verification by the local station of the absence or presence of a carrier of a modem coming from the central interrogation station;
   executing a transmission procedure;
   reconnecting the subscriber's ringer only during reception by the local station of a first call lasting a period of time greater than the first period of time, said reconnecting making the local station available for incoming calls from third parties; and
   rendering inoperative the ringer of the subscriber's line at the end of such a call from a third party.

2. A method according to claim 1, wherein in case of establishing the absence of a modem carrier coming from said central interrogation station, the step of executing the transmission procedure comprises:

sending a voice message by a message-generating device from the local station; and
   freeing of the telephone line while maintaining the subscriber's ringer inoperative.

3. A method according to claim 1, wherein in the case of establishing the presence of a modem carrier coming from said central interrogation station, the step of executing the transmission procedure comprises:

sending a secret code by said central interrogation station;
   data transmission by said local station after reception and verification of the secret code;
   acknowledgement of successful reception by the central interrogation station; and
   freeing of the telephone line while maintaining the subscriber's ringer inoperative.

4. In a system for transmission of information or measuring data from a local measuring device, located at a telephone subscriber's local station at a remote site, to a central interrogation station located at a central site where the data is processed, using a telephone line of a telephone network to which said subscriber subscribes while permitting the normal use of the subscriber's telephone line, wherein the subscriber's ringer is normally maintained inoperative and the transmission of the data from local station to central interrogation station is performed by maintaining the ringer inoperative, sending, during a first period of time, a first call from the central station to the local station over the telephone line, said period of time being at least equal to the time necessary for the central station to be able to verify that the line is not busy by receiving a ringing signal, sending a second call from the central station to the local station for a different period of time, establishing telephone contact with the local station, verification by the local station of the absence or presence of a carrier of a modem coming from the central interrogation station, executing a transmission procedure, reconnecting the subscriber's ringer only during reception by the local station of a first call lasting a period of time greater than the first period of time, said reconnection making the local station available for incoming calls from third parties, and rendering inoperative the ringer of the subscriber's line at the end of such a call from a third party, said local station comprising:

a circuit for detection of the ringing signal;
   means for evaluating the period of the ringing signal;
   means to provide tying up and freeing of the telephone line;
   means to measure a variable;
   means for storing the measurements of the variable;
   means for transmission of the stored measurements;
   means for connecting and disconnecting the subscriber's ringer;
   a microprocessor for control of the various means and for processing the instructions of a control program allowing the local station to execute the steps of tying up the telephone line after the central station sends the second call for the different period of time relative to the first call, verifying the absence or presence of a carrier of a modem coming from the central interrogation station including receiving and verifying a secret code sent by the central interrogation station and transmitting data to the central interrogation station after receiving and verifying of said secret code, executing a transmission procedure including sending a voice message and freeing the telephone line while maintaining the subscriber's ringer inoperative, and reconnecting the subscriber's ringer; and
   means for storing the control program.

5. A local station according to claim 4, comprising:
   a voice message-generating device; and means for displaying the measurement stored in the storing means.

6. In a system for transmission of information or measuring data from a local measuring device, located at a telephone subscriber's local station at a remote site, to a central interrogation station located at a central site where the data is processed, using a telephone line of a telephone network to which said subscriber subscribes while permitting the normal use of the subscriber's telephone line, wherein the subscriber's ringer is normally maintained inoperative and the transmission of the data from local station to central interrogation station is performed by maintaining the ringer inoperative, sending, during a first period of time, a first call from the central station to the local station over the telephone line, said period of time being at least equal to the time necessary for the central station to be able to verify that the line is not busy by receiving a ringing signal, sending a second call from the central station to the local station for a different period of time, establishing telephone contact with the local station, verification by the local station of the absence or presence of a carrier of a modem coming from the central interrogation station, executing a transmission procedure, reconnecting the subscriber's ringer only during reception by the local station of a first call lasting a period of time greater than the first period of time, said reconnection making the local station available for incoming calls from third parties, and rendering inoperative the ringer of the subscriber's line at the end of such a call from a third party, said central interrogation station comprising:

a microprocessor having random-access and read-only memories necessary for the functioning and execution of predetermined programs;

means for switching either the central station or the telephone line to the network;

a line state detector for analysis of line tones;

a call-dialing device;

a modem;

a line interface with duplexing device; and an interface to a data processing device.

7. A central interrogation station according to claim 6, wherein the data processing device is a microcomputer having associated peripheral equipment.

8. A central interrogation station according to claim 7, comprising:

diskette drive means for loading an interrogation program into the microcomputer thereby making it possible to choose an interrogation program as a function of a respective application and the number of local stations to be called.

9. A central interrogation station according to claim 7, comprising:

said microprocessor having a program which makes it possible to recover all or part of the data during the interrogations or after the end of the interrogations.

* * * * *